(12) United States Patent
Kee et al.

(10) Patent No.: US 6,338,534 B1
(45) Date of Patent: Jan. 15, 2002

(54) THEFT PREVENTION SYSTEM FOR TRAILERS

(76) Inventors: Dan B. Kee, 1 Mountain Brook Ct.; Clark W. Gray, 1106 Crimson Dr., both of Bentonville, AR (US) 72712

( * ) Notice: Subject to any disclaimer, the term of this patent is extended or adjusted under 35 U.S.C. 154(b) by 0 days.

(21) Appl. No.: 09/454,236

(22) Filed: Dec. 2, 1999

(51) Int. Cl.[7] .............................................. B60T 17/16
(52) U.S. Cl. ........................ 303/89; 303/123; 180/287
(58) Field of Search ........................ 303/89, 123, 127, 303/7, 9; 188/353, 265; 180/287

(56) References Cited

U.S. PATENT DOCUMENTS

| | | | |
|---|---|---|---|
| 3,735,834 A | 5/1973 | St. Onge | 180/112 |
| 4,519,653 A | 5/1985 | Smith | 303/89 |
| 4,621,874 A | 11/1986 | Gustafsson | 303/89 |
| 4,633,686 A | 1/1987 | Carr | 70/179 |
| 4,691,801 A | 9/1987 | Mann et al. | 180/287 |
| 4,712,422 A | 12/1987 | Munro | 73/129 |
| 4,793,661 A | 12/1988 | Munro | 303/89 |
| 4,881,388 A | 11/1989 | Pruim | 70/175 |
| 5,145,240 A | 9/1992 | Harless et al. | 303/89 |
| 5,378,929 A | 1/1995 | Mor et al. | 303/89 |
| 5,735,147 A * | 4/1998 | Cattanach et al. | 70/164 |
| 5,747,886 A * | 5/1998 | Parr et al. | 303/89 X |
| 5,871,435 A | 2/1999 | Numata et al. | 494/7 |

* cited by examiner

*Primary Examiner*—Pam Rodriguez
(74) *Attorney, Agent, or Firm*—Head, Johnson & Kachigian

(57) ABSTRACT

There is disclosed a theft prevention system for trailers with the customary pneumatic trailer braking system. A normally closed solenoid valve is connected in the line that supplies air to release the trailer parking brakes and a signal receiver adapted to receive an electrical signal from a transmitter in the tractor cab must be caused to actuate the solenoid to open the valve to release the trailer parking brakes. The signal from the transmitter to the receiver may be transmitted over the electrical cable from tractor to trailer or may be a radio transmitted signal. The solenoid valve is provided with a pneumatic latch so that the parking brakes will remain released as long as air pressure is provided. The signal transmitter is provided with security to prevent unauthorized use which may be a key switch, a key pad for entry of an identification number, a magnetic strip card reader or other device. The solenoid valve and receiver are secured in a locked cabinet and a by pass valve is also located within the cabinet. The receiver may be programed to require the lights to be turned on in whole or in part or sequentially to release the brakes.

15 Claims, 3 Drawing Sheets

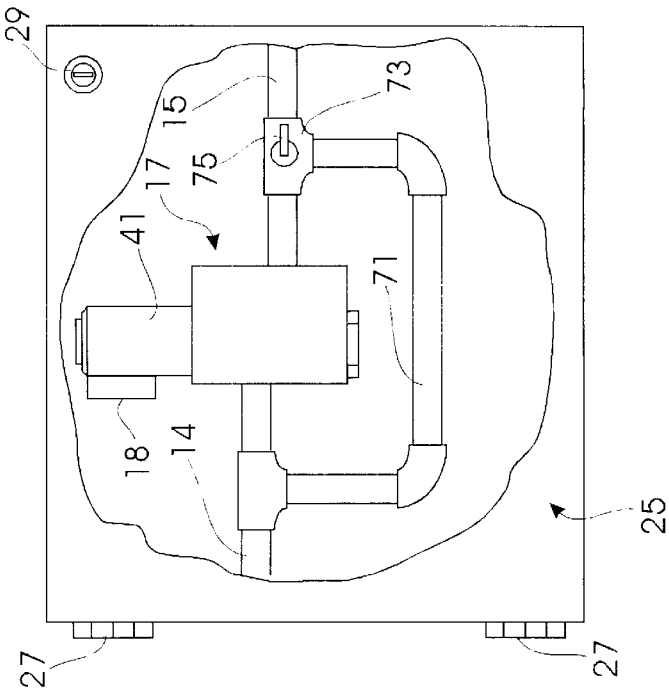
FIG. 5
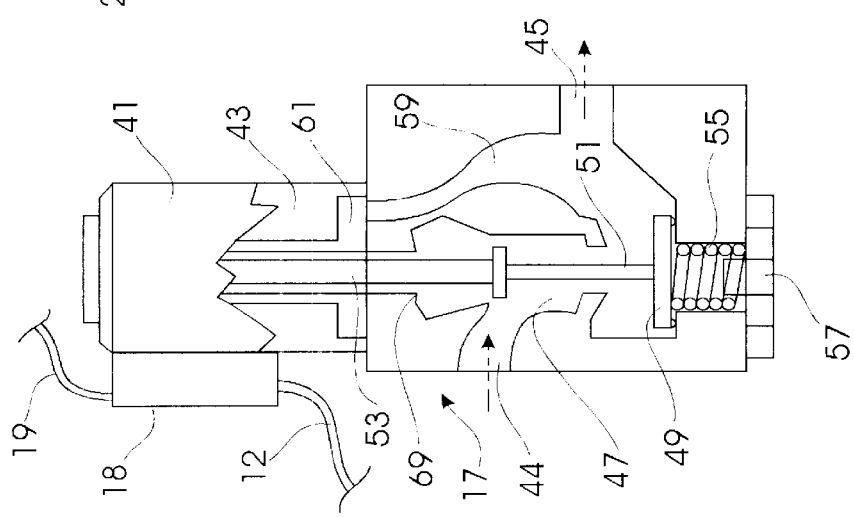
FIG. 4
FIG. 3

THEFT PREVENTION SYSTEM FOR TRAILERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention principally relates to theft prevention systems for trailers, particularly those used in a over-the-road tractor-trailer vehicle combination commonly referred to as an "18-wheeler". These trailers are almost universally provided with pneumatic braking systems which include a parking/emergency brake with brake shoes or other braking elements urged to the braking position by spring means in the absence of pneumatic pressure supplied to the braking system.

In this common arrangement, a parked trailer, being disconnected from the tractor vehicle with its source of air pressure will have its parking/emergency brakes (hereinafter simply "parking brakes") urged to fill braking position preventing the trailer from rolling or being moved. However, the commonly provided system can be moved by any standard tractor vehicle having the usual air hose and electrical connections for a trailer. Once the alien tractor is connected with its air hoses to the trailer and the trailer braking system is pressurized, the parking brakes air pressure causes the spring forces to be overcome so that the parking brakes are no longer applied.

Numerous expedients have been employed to prevent or deter theft of a parked trailer, including systems which require some action in addition to connecting air pressure to the pneumatic brake system to release the parking brakes. Some of the theft deterrent systems incorporate a solenoid valve in the appropriate air line between the tractor and the trailer rear wheels and have a key lock switch or other device required to energize the solenoid. The valve will open when the key switch is closed to allow air pressure from the tractor to release the brakes on the wheels of the trailer (as it would if the valve were not present). These prior systems typically drew current for the solenoid from the electrical cable providing power to the trailer lights, and thus some portion of the conductors of that cable needed to be connected and energized, but this in itself was not an anti-theft feature since this would occur in the course of normal procedure by the truck driver.

Systems as described above are shown, for example, in U.S. Pat. No. 4,793,661 and U.S. Pat. No. 4,712,422 to Dougald, G. Munro. In these patents, the theft of the trailer is deterred by operation of a solenoid valve by a key operated switch on the trailer. Rather than being a key switch, the switch may take the form of a keyboard module switch operable only by a person in possession of the required key code. Note that the key-operated switch is on the trailer, and only standard equipment connections from a tractor are required so that an alien tractor can take the trailer if the operator is in possession of a key or a key code. U.S. Pat. No. 4,691,801 to Yale Mann and Pekka Sarssi describes a vehicle protection device which, in addition to a fuel valve block and other features, also has a parking brake lock for trailer brakes; all of these are operated by a portable infrared transmitter (rather than the key operated switch or keyboard module switch of the Munro patents). U.S. Pat. No. 5,378,929 to Yitzchak Mor and Daniel Yuranyi describes a somewhat more complicated system of valves and alarms than those discussed above whereby the system can be manually activated using a hand-held remote control transmitter and receiver (or a hard-wired switch) located somewhere in the trailer.

U.S. Pat. No. 4,621,874 to Jan Gustafsson is a vehicle theft preventing device for brakes operated with compressed air having a particular valve system and which requires the operation of a code lock on the trailer to release the brakes by pressing the correct code to adjust a valve to release the brakes. U.S. Pat. No. 3,735,834 to Daniel A. St. Onge describes a brake locking system with a key operated mechanism on the trailer required to close a normally open relay by use of a proper key; the valves of the system cannot be operated to admit air pressure to release spring force applying the brakes without such a proper key even though air pressure and EMF (through an electric cable) are connected to the vehicle.

Other patents relevant to the background of the invention and to the state of the art are U.S. Pat. No. 4,519,653 to Paul B. Smith and U.S. Pat. No. 4,881,388 to Ronald Pruim.

In addition to use of key-operated switches, numeric keypads for entry of key codes, or combination switches that may be used to generate a locking or unlocking signal in a vehicle security device, there are other security applications in which unauthorized operation is controlled by provision of a card reader which identifies an ID card of an operator seeking to operate the device. Such apparatus for management of the operation of a centrifuge is shown In U.S. Pat. No. 5,871,435 to Satoshi Numata, et al. Portions of such apparatus may be employed in an ID card reader version of Applicant's invention. As evidencing the state of the art relevant to the enablement of Applicant's disclosure, the Numata et al. patent and the other relevant patents above are to be considered incorporated by reference here.

BRIEF SUMMARY OF THE INVENTION

The present invention is directed to a theft prevention system for tractor-trailer transport vehicles. In particular, such trailers usually employ an air brake system using two air lines where one parking air line controls the trailer's parking/emergency brakes and another system air line controls the regular operating brakes. Air supplied by an air pressure supply means at the tractor controls both brake systems. In accordance with DOT specifications, the emergency brakes should set automatically when the trailer is parked and/or the air supply is disconnected. A major problem as mentioned above is that the thieves, if not otherwise deterred, can steal an entire parked trailer by coupling a tractor to the trailer, releasing the parking brakes in the customary manner, and driving away with the trailer in tow.

While previous anti-theft systems have provided locking means for parked trailers which prevented the release of parking brakes, the present invention has advantages and special features which primarily relate to a regimen of preventing alien tractors not belonging to a trucking company from releasing the parking brake in a trailer belonging to a trucking company equipped with the system of the present invention. The receiver and solenoid valve of the present invention are responsive only to a special transmitter installed in an authorized tractor. Thus, only authorized tractors can couple to and successfully deactivate the parking brakes. Although a wireless transmitter in a tractor may be utilized to transmit the signal to release the parking brakes, it is preferred that a signal be transmitted over existing conductors in the electric cable connected to the trailer for controlling and powering the lighting of the trailer. Numerous types of signaling may be employed including DC, AC, audio frequency and radio frequency transmission. The coding of the signal required by the receiver to actuate the solenoid valve to release the emergency brakes can be as complex as desired to prevent would-be thieves from sending a false signal not originating from an authorized tractor to release the trailer brakes. In a preferred embodiment, the electrical and pneumatic components of the system are configured so that continued receipt of the parking brake release signal is not required as long as air pressure to the trailer is maintained above a minimum value and the electrical power to the lighting system or theft prevention system are not interrupted.

Another optional feature of the system requires that the driver of the truck have a key, key code, or key card to activate the transmitter rather than to simply flip a switch in the tractor cab. This gives additional security that upon gaining access to the tractor cab, one cannot release the tractor brakes without having a necessary key, key code or key card.

In accordance with another optional feature of the system, the receiver and the decoder forming a part thereof may require that several or all of the trailer light circuits be energized to operate the solenoid brake release valve. Thus the driver could be required to test the lights before releasing the brakes. A more sophisticated version may require that trailer lighting circuits be energized in a particular sequence. In the latter case, this could operate as an additional "code" making the theft of the trailer using an unauthorized tractor more difficult. The present theft prevention system has an advantage over previous systems in that it does not require removal, replacement or modification of the standard trailer air brake system. It does not interact with the service line for the regular operating brakes at all and requires only the insertion of a solenoid valve in the parking air supply line which can be conveniently done near the point where such air line enters the trailer. The theft prevention receiver unit of the present invention also requires a simple connection to two or more conductors of the standard electrical cable connected to the trailer to supply power to the various lighting circuits. The transmitter in the tractor cab only requires connection to the electrical system of the tractor, preferably being connected into a circuit or circuits for the trailer lights. If desired, the trailer solenoid may be provided with a bypass air line and a manual control valve so that the theft prevention system can be effectively disabled if necessary without requiring the services of a technician. Of course, the bypass manual valve would have to be locked and/or within a locked cabinet. Preferably the trailer receiver and solenoid valve are positioned in a locked cabinet to deter a thief from "hot-wiring" or otherwise defeating the theft prevention system.

In addition to providing the features and advantages described above, it is an object of the present invention to provide a theft prevention system for tractor-trailer transport vehicles that is implemented without modification of trucks or trailers other than by adding a transmitter in the tractor cab and a receiver and solenoid valve in the trailer leaving the air line connections and electrical cable connections without modification and allowing the tractor to be coupled to the trailer in conventional fashion.

It is another object of the present invention to provide a theft prevention system in which an operator of an authorized tractor-trailer can connect a trailer to the tractor in customary fashion and, by activating a transmitter within the cab, proceed to release the parking brakes in the customary manner in a simple and expeditious manner.

It is yet another object of the present invention to provide a theft prevention system for trailers in which normally locked parking brakes in compliance with DOT specifications require for brake release that a signal be transmitted to a receiver in the trailer by activating a transmitter in the cab and the action required by the driver to activate the transmitter is wiping a suitably encoded magnetic strip card through a card reader in the cab.

It is a further object of the present invention to provide a theft prevention system for trailers having a solenoid valve in a trailer air line which must be open to release the trailer parking brakes wherein the solenoid valve has an integral pneumatic latch so that once opened by the solenoid, the valve is open as long as pressure is applied to the trailer parking brake air line.

It is a still further object of the present invention to provide a theft prevention system for trailers having a solenoid valve controlling release of the parking brakes is activated to release the brakes only upon energization of a plurality of the lighting circuits for the trailer.

Further objects and advantages of the present invention will be understood by those skilled in the art by reference to the following description and the appended drawings.

BRIEF DESCRIPTION OF THE SEVERAL VIEWS OF THE DRAWINGS

FIG. 3 is a schematic, partially sectional view of a solenoid valve particularly adapted for use in a system of the present invention, in the closed position;

FIG. 4 is a schematic, partially sectional view of a solenoid valve particularly adapted for use in a system of the present invention, in the open position;

FIG. 5 is a schematic diagram partially broken away showing within a locked cabinet the solenoid valve of FIGS. 3 and 4 wherein a manually valved bypass is provided for the solenoid valve.

DETAILED DESCRIPTION OF THE PREFERRED EMBODIMENTS

Figure 1:
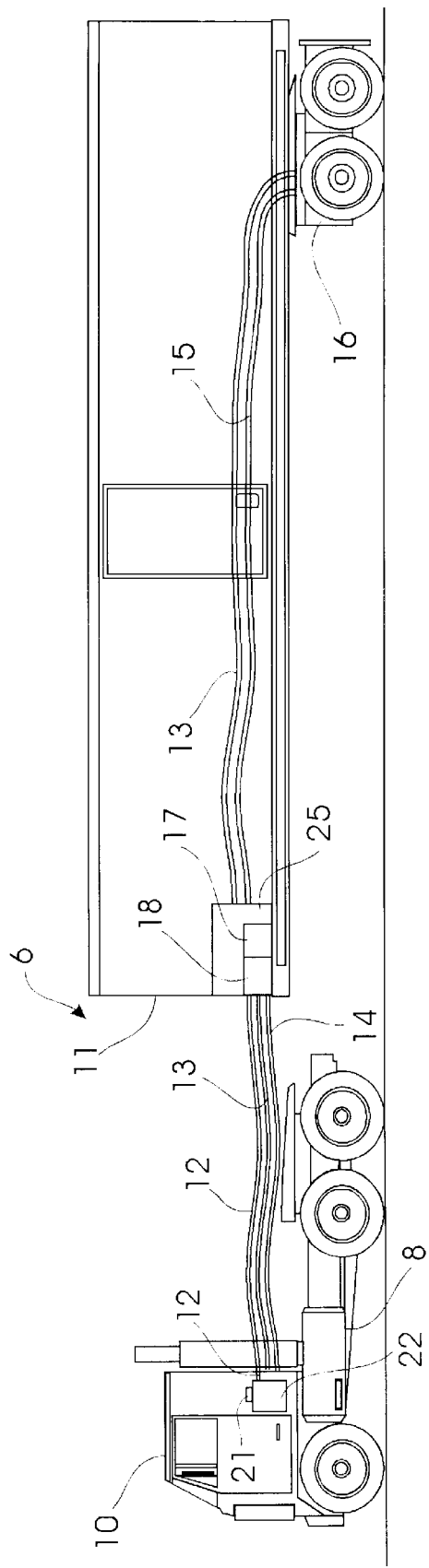
FIG. 1 is a partially schematic side view of a tractor-trailer transport vehicle having an anti-theft system according to the invention.

Referring now to the drawings, and particularly FIG. 1, a trailer transport vehicle is shown including a tractor 8 with a cab 10 and a trailer 11 to which the theft prevention system for trailers according to the invention is applied. Typically the invention will be applied to a tractor-trailer transport vehicle 6 of a common type referred to as an "18-wheeler". Although the invention is particularly adapted to such tractors and semi-trailers, it may be used with any truck/trailer combination in which the trailer has air brakes and a pneumatic system supplied with pressurized air from the tractor or truck pulling the trailer.

Trailer 11 is equipped with a conventional pneumatic braking system which includes brakes and brake control valves (not shown in detail) at 16 for the wheels on the two trailer axles. Conventionally connected air hoses 13 and 14 constitute an air pressure supply means including a service air supply line and a parking air supply line, respectively.

A conventional electrical cable 12 provides power and control for the lights of the trailer and also is adapted to power a solenoid valve 17 and a signal receiver 18 of the theft prevention system. Preferably, the solenoid valve 17 and the signal receiver 18 are secured in a limited access cabinet 25 provided with a key lock or other means to limit access only to those authorized to perform maintenance or repair or the like. Normally the input to the solenoid valve 17 will be connected to the parking air supply line 14 while the output of the solenoid valve 17 will be connected to a parking brake air line 15 whereby the pressure in the parking brake air line is in part controlled by the solenoid valve 17. It will also be noted that electrical cable 12 connects to the receiver 18 (in addition to providing power for the trailer lights in a manner not shown). Thus, two or more conductors of cable 12 are available to provide power to receiver 18 which in turn powers the solenoid valve 17.

As previously discussed, an important feature of the preferred embodiment of the invention is that the solenoid valve 17 and the receiver 18 cannot be operated by the driver of a tractor which has not been equipped with a transmitter 22 to cooperate with the theft prevention system. In the cab 10 of tractor 8 is installed transmitter 22 which transmits a coded or otherwise appropriate signal to receiver 18 to effectuate release of the parking brakes by operation of solenoid 17. Preferably, electrical cable 12 is connected to transmitter 22 so that the signal to receiver 18 is transmitted on cable 12 and only on cable 12 using two or more of the conductors in that cable. Transmitter 22 is provided with a driver control element 21 which in a simple form of the invention could be a push button or lever switch for sending a DC, AC, audio frequency, or radio frequency signal to receiver 18. Obviously, it is desirable that the signal sent be sufficiently complex or encoded to prevent a false or counterfeit signal easily being injected into cable 12 to release the parking brakes of trailer 11.

In most cases it will be preferable that driver control element 21 provides extra security by requiring a conventional key to operate the switch or have the form of some access-limiting device such as a magnetic strip card reader, an optical card scanner, fingerprint scanner, a numerical touch pad, computer microchip controlled, or computer interfaced with onboard computer to initiate the signal from transmitter 22 to receiver 18. When interfaced with an onboard computer communicating by satellite with a base station, two-way coupling between driver control element 21 and onboard computer makes data on operator ID, etc. available at the base station and, optionally, permits remote control of brake release over the satellite link.

It will be understood that driver control element 21 may be represented by any of these access-limiting devices as well as by a simple push button or key lock switch. By way of example, driver control element 21 may take the form of a magnetic strip card reader and associated data processing means as shown and described in the U.S. patent to Numata et al., U.S. Pat. No. 5,871,435 for Centrifuge Management System.

Figure 2:
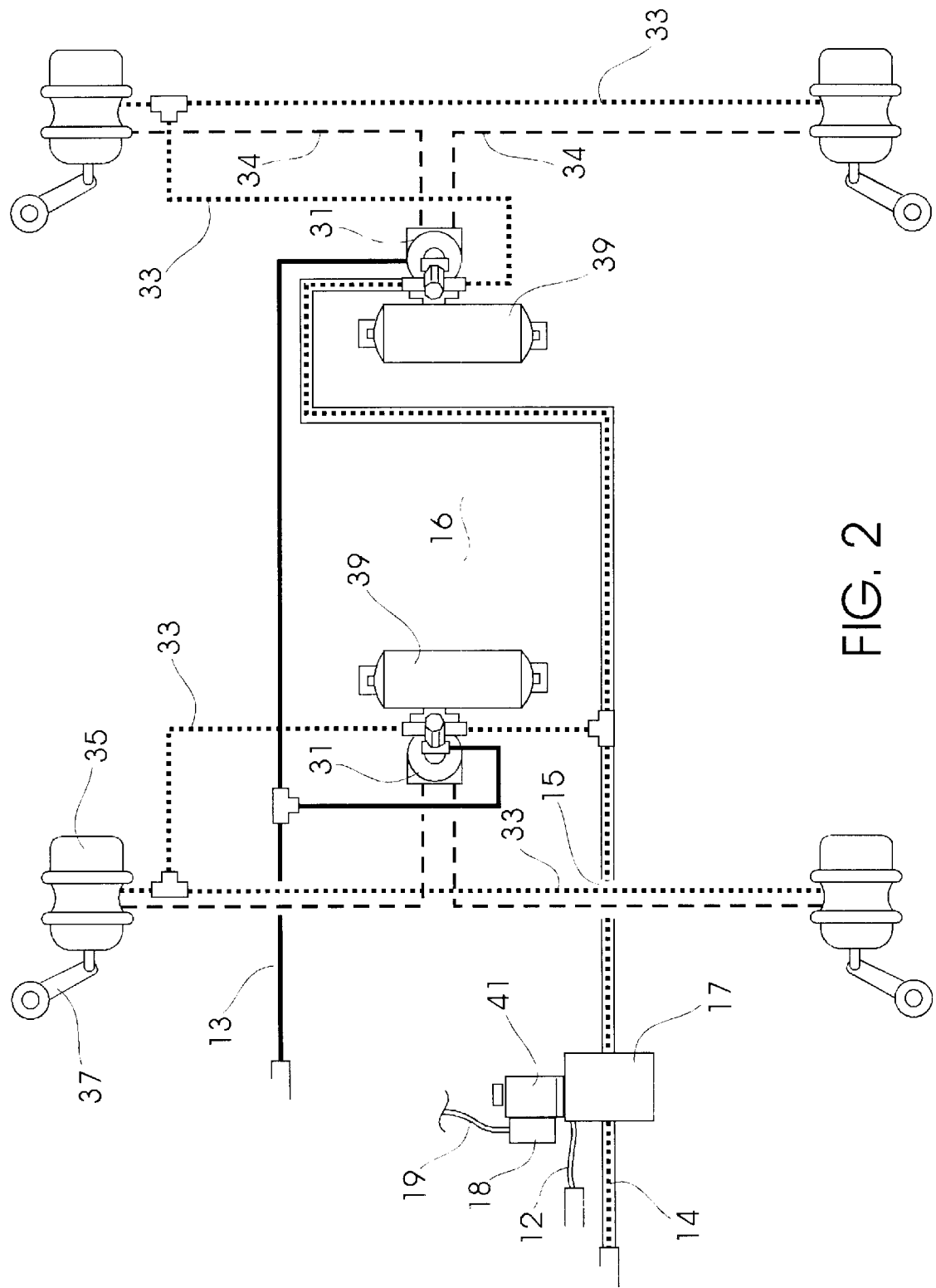
FIG. 2 is a schematic diagram of a conventional trailer pneumatic brake system having a solenoid valve and associated receiver connected to control the air supply in the parking brake air line.

FIG. 2 shows a schematic diagram of a typical conventional pneumatic truck/trailer braking system with the addition of a solenoid valve 17 and a receiver 18 to implement the theft prevention system according to the present invention. The service line 13 for normal braking in on the road operation connects to emergency relay valve assemblies 31 from which service line branches 34 lead to the respective spring brakes 35 which actuate friction braking elements such as brake shoes or the like (not shown in FIG. 2).

As previously described, parking air supply line 14 is connected to the inlet of solenoid valve 17 and the air pressure communicated by parking air supply line 14 through solenoid valve 17 when open is imparted through parking brake air line 15 to parking/emergency relay valve assemblies 31 and thence through parking air branch lines 33 to appropriate inlets of spring brakes 35. Although a solenoid valve such as 17 could also be utilized in service line 13, it is preferred that the service line and the related normal operation of the brakes for decelerating on the road shall not be modified in any way and that normal braking be totally unaffected by addition of the theft prevention system of the present invention.

It will be noted that, as previously mentioned, receiver 18 preferably receives both power and control signals through cable 12 already present for transmitting power to the trailer lights. As few as two of the half dozen or so conductors in the common form of electrical cable 12 may actually be connected to the receiver 18. Alternatively, a greater number or all of the conductors may be so connected. As shown in FIG. 2, the cable 12 from the tractor has a continuation cable 19 which is routed to the trailer lighting in normal fashion.

A preferred form of solenoid valve 17 is shown schematically in FIG. 3 and FIG. 4 with FIG. 3 showing the valve closed causing the parking brakes to be applied while FIG. 4 shows the valve open and latched to release the parking brakes by supplying air pressure to the parking brake air line from the parking air supply line.

Solenoid valve 17 is provided with a conventional solenoid actuator 41 having a winding 43. Solenoid valve 17 has an inlet 44 which is provided with a suitable hose connector (not shown) to receive parking air supply line 14. Similarly, an outlet 45 is provided with a suitable connector (not shown) for connecting parking brake air line 15. Inlet 44 leads to a chamber 47 which, in the position shown in FIG. 3, is closed by disc 49 urged upward by spring 55. It will be noted that in the position shown in FIG. 3 a vent 57 is open so that outlet 45 communicates with the atmosphere, thereby bleeding off any pressure that might exist in parking brake air line 15. When solenoid 41 is activated by a current to windings 43 from receiver 18 in response to a signal received over cable 12, solenoid armature 53 extends as shown in FIG. 4 causing valve stem 51 to move disc 49 to close the vent 57 while opening a passage from inlet 44 to outlet 45. This causes the pressure present at inlet 44 (at least about 100 psi) to be communicated to the parking brake air line 15 allowing release of the trailer brakes. The extension of armature 53 also opens a path between a pilot chamber 61 and chamber 47. The pressure in pilot chamber 61 is caused to be the same as that at outlet 45 by the pilot channel 59.

While in the open position, shown in FIG. 4, solenoid valve 17 is latched open as long as a predetermined minimal pressure is present in chamber 47 sufficient to overcome the force of spring 55. Preferably, the spring constant of spring 55 is determined to allow the spring force to be overcome if the pressure differential between chamber 47 and the atmosphere at vent 57 is greater than 15–25 pounds psi. Thus, it will be seen that in usual operation, the solenoid valve 17 will cause the path therethrough to remain open as long as pressure of approximately 20 lbs. Psi, but when the source of the pressure is disconnected, spring 55 will cause the valve to close and it cannot thereafter be opened without an appropriate signal received at receiver 18 to operate the solenoid 41.

FIG. 5 shows cabinet 25 for preventing unauthorized access to the receiver 18 and the solenoid valve 17 and also shows an alternative embodiment of the invention including a manual bypass to permit the brake system to function as if the theft prevention system were not present, as may be desired for purposes of maintenance, repair, or other contingencies.

Cabinet 25 may be of conventional form with hinges 27 and a key lock 29 with whatever degree of security against intrusion might be desired. For simplicity, solenoid valve 17, solenoid 41 and receiver 18 are shown without the electrical cable connection that would be present to power solenoid 41 and receiver 18. In FIG. 5 a bypass line 71 provides a path around solenoid valve 17 and a two position valve 73 is connected in line 15. In the position shown in FIG. 5 all air flow is through line 15 and solenoid valve 17 so that solenoid valve 17 controls the operation of the brakes of the trailer. In a rotated position of 90° of lever 75, valve 73 disconnects line 15 from valve 17 connecting it instead through bypass 71 to parking air supply line 14 whereby solenoid valve 17 no longer has any affect on the operation of the parking brakes. The bypass line 71 and valve 73 of FIG. 5 is an optional feature of the apparatus and other means might be employed to override the operation of solenoid valve 17 or spring 55 as desired.

It will thus be seen that the theft prevention system for trailers according to the invention interacts with the customary pneumatic trailer braking system having spring actuated parking brakes that apply when in absence of pressure in an air supply line to the trailer from a tractor-mounted compressed air tank. A normally closed solenoid valve is connected in series with the pressurized air supply line that supplies air to release the trailer parking brakes and a signal receiver adapted to receive an electrical signal from a transmitter in the tractor cab must be caused to actuate the solenoid to open the valve to release the trailer parking brakes. The signal from the transmitter to the receiver may be a dc, ac, or high frequency signal transmitted over the normally provided electrical cable from tractor to trailer from tractor to trailer or may be a radio transmitted signal wherein of the kind employed for garage door openers.

The solenoid valve is preferably provided with a pneumatic latch so that the parking brakes will remain released as long as air pressure is provided to the trailer once an enabling signal is received by the receiver. The signal transmitter is preferably provided with appropriate security means to prevent unauthorized use which may be a key switch, a key pad for entry of an identification number, a magnetic strip card reader or other conventional device. The solenoid valve and receiver in the trailer may be secured in a locked cabinet and, if provided, a manual by pass valve for the solenoid valve may also be within the cabinet. The receiver and the solenoid valve are powered from the same electrical cable which provides power to the trailer lights and the receiver may be programed to require the lights to be turned on in whole or in part or sequentially to release the brakes.

Reviewing the operation of the theft prevention system according to the invention, it will be noted that no special action is required on the part of the driver to set the trailer brakes when it is parked and disconnected from the tractor. When standard hose connectors are uncoupled to disconnect the tractor, there is no longer any source of pressure for the parking air supply line 14 and the parking brake air line 15 so that the normal operation of the trailer braking system causes the parking brakes to be set. This is facilitated by the fact that spring 55 returns disc 49 from the position shown in FIG. 4 to the position shown in FIG. 3 thereby opening outlet 45 and parking brake air line 15 to atmospheric pressure.

If an alien truck attempts to move the trailer, the driver will find that the brakes cannot be released normally by applying pressure to the parking air supply line in the absence of a coded signal transmitted to receiver 18 due to the action of solenoid valve 17. Solenoid valve 17 has assumed an unlatched position as shown in FIG. 3 and spring 55 causes disc 49 to close the path between inlet 44 and outlet 45 and also open outlet 45 to the vent 57 and to atmospheric pressure. The coded signal required by receiver 18 needs to be sufficiently complex so that it cannot be provided by a would-be thief and such signal coding arrangements are well-known, in the remote garage door opener art for example. Although not the preferred arrangement, a remote transmitter such as used in the garage door opener art could be permanently installed in the cab of the tractor with the receiver 18 having the remote receiver for such transmitter. Such remote transmitter and receiver arrangements employ radio transmission which is considered less desirable than transmitting the coded signal over conductors of electrical cable. Thus it would be desirable to modify the garage door type remote transmission and reception units so that a lower frequency signal was transmitted over conductors of electrical cable 12. This would avoid a problem of radio frequency transmissions that trailer brakes could be released by a hand-held transmitter or by the transmitter of a tractor near to, but not connected to, the trailer.

A preferred form of the invention for deterring theft comprises a card reader operated transmitter 22 in which the driver operated device 21 is a card reader of the type disclosed in U.S. Pat. No. 5,871,435 and which is generally known in the art. In a manner known in the art, the data on a magnetic strip card would be read and, if such data indicated an authorized operator, then a suitably coded digital signal would be sent over conductors of cable 12 to receiver 18. Such technology is well known in the employee attendance and time accounting art and elsewhere and will not be described in detail here. Numerous other possibilities for communicating a coded signal to receiver 18 as discussed above are available. Another example of using well-known technology is the use of a telephone touch tone keypad at the transmitter and a touch tone decoder at the receiver 18. In such case, the signal would be transmitted over two of the conductors of cable 12 which may be unused conductors or conductors which are also used for transmission of DC current to the lighting circuits. It will be seen that the desirable attributes of having a transmitter of special characteristics in the cab and utilizing the electrical cable 12 for transmission of coded signals to receiver 18 can be accomplished in a variety of different ways utilizing known techniques taken from the communication and other arts.

Considering now the actions that may be required of an authorized driver operating an authorized tractor in connecting to and releasing the brakes of a trailer equipped with the theft prevention system according to the invention, it will first be noted that all actions required of the driver in addition to the normal hookup are performed in the cab. Assuming that the driver operated control of the transmitter in the cab is a magnetic strip card reader, and the running or marker lights of the trailer are the electrical circuit selected to power the receiver and the solenoid valve, then the following actions need to be taken. The normal hookup procedures, including connecting air hoses and electrical cable are performed in the normal manner. The marker or running lights are turned on from the tractor cab, and any brake release procedure required in the cab is performed. The driver takes a designated appropriate magnetic strip card and inserts it in or wipes it through the magnetic card reader of the transmitter.

These actions will send a coded signal to the receiver in the trailer while the pressure from the tractor is applied to the parking air supply line, thus latching open the solenoid valve to apply and maintain pressure in the parking brake air line to release the parking brakes and keep them in the released position as long as pressure is received from the tractor. Thus it will be seen that virtually the only extra steps required by the driver are to turn on some trailer lights and pass a magnetic strip card through a reader to unlock the anti-theft system and proceed with the trailer in tow. In many cases the magnetic strip card used by the driver may be a magnetic strip card provided by the company to drivers and/or other employees for use in other company procedures.

In addition to the modifications and variations to the invention that have been shown, described, or suggested, other variations and modifications will be apparent to those of skill in the art and, accordingly, the scope of the invention is not to be limited to those specific variations and modifications disclosed but is to be determined by reference to the appended claims.

What is claimed is:

1. In a tractor-trailer transport vehicle having a tractor with a cab, a trailer, electrical cables and connectors therebetween, said tractor having an air pressure operated brake system with air pressure supply means and a parking air supply line to a parking brake air line of said trailer, a safety and security system comprising:
    an electric signal transmitter installed in said cab;
    a signal receiver in said trailer adapted to detect signals from said transmitter and produce a low voltage output;
    a solenoid valve in said trailer responsive to be activated by a low voltage DC output from said signal receiver and adapted to open a normally closed valve from said parking brake air line to said parking air supply line,
    wherein said solenoid valve includes a latch element responsive to high pressure air in said parking brake line to hold said normally closed valve in an open position in response to a predetermined minimum air pressure in said parking brake air line;
    whereby the parking brakes of said trailer can only be released when an appropriate signal is transmitted from said cab-installed transmitter.

2. Apparatus as recited in claim 1 wherein said signal receiver is supplied with power through said electrical cables for operation.

3. Apparatus as recited in claim 1 wherein said predetermined minimum air pressure is about 20 psi.

4. Apparatus as recited in claim 3 wherein said signal receiver is supplied with power through said electrical cables for operation and for sending a low voltage output to activate said solenoid.

5. Apparatus as recited in claim 1 wherein signals from said transmitter are transmitted to said signal receiver over one or more conductors of said electrical cables.

6. A solenoid valve for use in a trailer parking brake security system for trailers having parking brakes, a parking brake air supply line connectable to a tractor for the trailer and a parking brake air line which supplies air pressure to release the trailer parking brakes, said solenoid valve comprising:
    a solenoid having windings and an armature operated from a first position to a second position by electric current supplied to said windings;
    a first valve element connected to said armature arranged to be closed when said armature is in the first position and open when said armature is in the second position, said first valve being in a passage between said brake air supply line and said parking brake air line;
    a second valve element connected to said armature and arranged to be open when said armature is in said first position and closed when said armature is in said second position;
    said second valve being located in a passage between said parking brake air line and the atmosphere;
        a bias spring urging said armature to said first position;
        a latch element responsive to high air pressure in said parking brake air line to hold said armature in said second position without regard to activation of said solenoid;
    whereby activation of said solenoid is required to provide air pressure to said parking brake air line to release the trailer brakes, but continued activation of the solenoid is not required for release of the brakes as long as air pressure from said parking air supply line is not interrupted.

7. Apparatus as recited in claim 6 wherein said armature is restrained to sliding motion along an axis and said first valve is substantially aligned with said axis.

8. Apparatus as recited in claim 7 wherein said second valve is aligned with said first valve and said axis.

9. Apparatus as recited in claim 8 wherein the spring constant of said bias spring is great enough to move said armature to said first position if air pressure in said parking brake air line is less than 20 psi.

10. Apparatus as recited in claim 7 wherein said second valve is aligned with said first valve and said axis.

11. Apparatus as recited in claim 6 wherein the spring constant of said bias spring is great enough to move said armature to said first position if the air pressure in said parking brake air line is less than about 20 psi.

12. In a tractor-trailer transport vehicle having a tractor with a cab, a trailer, electrical cables and connectors therebetween, said tractor having an air pressure operated brake system with air pressure supply means and a parking air supply line to a parking brake air line of said trailer, a safety and security system comprising:
    an electric signal transmitter installed in said cab;
    a signal receiver in said trailer adapted to detect signals from said transmitter and produce a low voltage output, said signal receiver being supplied with power through said electrical cables;
    a solenoid valve in said trailer responsive to be activated by a low voltage DC output from said signal receiver and adapted to close a normally open vent to atmosphere from said parking brake air line while operating a normally closed valve from said parking brake air line to said parking brake air supply line;
    wherein said solenoid valve includes a latch element responsive to high pressure air in said parking brake line to hold said normally closed valve in an open position in response to a predetermined minimum air pressure in said parking brake air line;
    whereby the parking brakes of said trailer can only be released when an appropriate signal is transmitted from said cab-installed transmitter.

13. Apparatus as recited in claim 12 wherein signals from said transmitter are transmitted to said signal receiver over one or more conductors of said electrical cables.

14. Apparatus as recited in claim 13 wherein said electrical cables have at least four conductors and said signal receiver is responsive to the status of electrical current or voltage for each of at least four of said conductors.

15. In a tractor-trailer transport vehicle having a tractor with a cab, a trailer, electrical cables and connectors therebetween, said tractor having an air pressure operated brake system with air pressure supply means and a parking air supply line to a parking brake air line of said trailer, a safety and security system comprising:

an electric signal transmitter installed in said cab;

a signal receiver in said trailer adapted to detect signals from said transmitter and produce a low voltage output;

a solenoid valve in said trailer responsive to be activated by a low voltage DC output from said signal receiver and adapted to open a normally closed valve from said parking brake air line to said parking air supply line;

wherein said electrical cables have at least four conductors and said signal receiver is responsive to the status of electrical current or voltage for each of at least four of said conductors;

whereby the parking brakes of said trailer can only be released when an appropriate signal is transmitted from said cab-installed transmitter;

wherein said signal receiver is supplied with power through said electrical cables for operation and for sending a low voltage output to activate said solenoid; and wherein said solenoid valve includes a latch element responsive to high pressure air in said parking brake air line to hold said normally closed valve in an open position in response to a predetermined minimum air pressure in said parking brake air line.

* * * * *